(12) United States Patent
Sharma (10) Patent No.: US 8,107,396 B1
(45) Date of Patent: Jan. 31, 2012

(54) HOST TRACKING IN A LAYER 2 IP ETHERNET NETWORK

(75) Inventor: Govind P. Sharma, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 644 days.

(21) Appl. No.: 11/459,524

(22) Filed: Jul. 24, 2006

(51) Int. Cl.
H04L 12/28 (2006.01)
G06F 15/173 (2006.01)

(52) U.S. Cl. ........................ 370/254; 709/225
(58) Field of Classification Search .................. None
See application file for complete search history.

(56) References Cited

U.S. PATENT DOCUMENTS

| | | | | |
|---|---|---|---|---|
| 5,278,829 | A * | 1/1994 | Dunlap | 370/257 |
| 5,668,952 | A * | 9/1997 | Slane | 709/245 |
| 6,249,814 | B1 * | 6/2001 | Shaffer et al. | 709/223 |
| 6,532,217 | B1 * | 3/2003 | Alkhatib et al. | 370/252 |
| 6,931,452 | B1 * | 8/2005 | Lamberton et al. | 709/242 |
| 7,234,163 | B1 * | 6/2007 | Rayes et al. | 726/22 |
| 7,464,183 | B1 * | 12/2008 | Ioffe et al. | 709/245 |
| 7,471,684 | B2 * | 12/2008 | Finley et al. | 370/392 |
| 7,490,351 | B1 * | 2/2009 | Caves et al. | 726/13 |
| 7,596,693 | B1 * | 9/2009 | Caves et al. | 713/161 |
| 2002/0023174 | A1 * | 2/2002 | Garrett et al. | 709/245 |
| 2003/0037163 | A1 * | 2/2003 | Kitada et al. | 709/236 |
| 2003/0140283 | A1 * | 7/2003 | Nishio | 714/43 |
| 2003/0165160 | A1 * | 9/2003 | Minami et al. | 370/466 |
| 2004/0017814 | A1 * | 1/2004 | Shimada | 370/395.52 |
| 2004/0062267 | A1 * | 4/2004 | Minami et al. | 370/463 |
| 2004/0103282 | A1 * | 5/2004 | Meier et al. | 713/171 |
| 2004/0167988 | A1 * | 8/2004 | Rune et al. | 709/238 |
| 2005/0050365 | A1 * | 3/2005 | Seki et al. | 713/201 |
| 2005/0195753 | A1 * | 9/2005 | Chaskar et al. | 370/254 |
| 2006/0031488 | A1 * | 2/2006 | Swales | 709/224 |
| 2006/0209818 | A1 * | 9/2006 | Purser | 370/389 |
| 2007/0004436 | A1 * | 1/2007 | Stirbu | 455/503 |
| 2007/0058655 | A1 * | 3/2007 | Myers | 370/437 |
| 2008/0195700 | A1 * | 8/2008 | Jonsson | 709/203 |
| 2008/0298257 | A1 * | 12/2008 | Cheshire et al. | 370/242 |
| 2009/0260083 | A1 * | 10/2009 | Szeto et al. | 726/22 |

* cited by examiner

Primary Examiner — Ayaz Sheikh
Assistant Examiner — Timothy J Weidner
(74) Attorney, Agent, or Firm — Patterson & Sheridan LLP (57) ABSTRACT

A method and an apparatus to detect end host machines in a layer 2 Ethernet network are provided. The knowledge of the detected hosts may then be utilized by various security applications operating on layer 2 devices at the access and the distribution layers of the network for host session monitoring. Hosts that are no longer connected or do not respond to a layer 2 query may have their access privileges revoked.

16 Claims, 7 Drawing Sheets

410

ARP REQUEST HEADER

| | BITS 0-7 | BITS 8-15 | BITS 16-31 |
|---|---|---|---|
| 0 | HARDWARE TYPE= 0x0001 (ETHERNET) | | PROTOCOL TYPE= 0x0800 (IP) |
| 32 | HARDWARE ADDRESS LENGTH= 0x06 (ETHERNET) | PROTOCOL ADDRESS LENGTH= 0x04 (IPv4) | OPERATION CODE= 0x0001 (REQUEST) |
| 64 | SENDER HARDWARE ADDRESS (SHA)= 00:09:68:4D:FA:37 ⟹ 0x0009684D | | |
| 96 | SHA (CONTINUED)= 0xFA37 (MAC2) | | SENDER PROTOCOL ADDRESS (SPA)= 0.0.0.0. ⟹ 0x0000 |
| 128 | SPA (CONTINUED)= 0x0000 | | TARGET HARDWARE ADDRESS (THA)= 0x0000 |
| 160 | THA (CONTINUED)= 0x00000000 (IRRELEVANT) | | |
| 192 | TARGET PROTOCOL ADDRESS (TPA)= 10.10.10.114 ⟹ 0x0A0A0A72 (IP3) | | |

INITIAL ETHERNET HEADER

| FF:FF:FF:FF:FF:FF | 00:09:47:A3:2C:11 | 0x0806 |
|---|---|---|
| DESTINATION MAC | SOURCE MAC (MAC3) | FRAME TYPE |

INITIAL ARP BROADCAST HEADER

| | BITS 0-7 | BITS 8-15 | BITS 16-31 |
|---|---|---|---|
| 0 | HARDWARE TYPE= 0x0001 (ETHERNET) | | PROTOCOL TYPE= 0x0800 (IP) |
| 32 | HARDWARE ADDRESS LENGTH= 0x06 (ETHERNET) | PROTOCOL ADDRESS LENGTH= 0x04 (IPv4) | OPERATION CODE= 0x0001 (REQUEST) |
| 64 | SENDER HARDWARE ADDRESS (SHA) = 00:09:47:A3:2C:11 ⟹ 0x000947A3 | | |
| 96 | SHA (CONTINUED)= 0x2C11 (MAC3) | | SENDER PROTOCOL ADDRESS (SPA)= 10.10.10.114 ⟹ 0x0A0A |
| 128 | SPA (CONTINUED)= 0x0A72 (IP3) | | TARGET HARDWARE ADDRESS (THA)= 0x0000 |
| 160 | THA (CONTINUED)= 0x00000000 | | |
| 192 | TARGET PROTOCOL ADDRESS (TPA)= 10.10.10.228 ⟹ 0x0A0A0AE4 (IP1) | | |

| | BITS 0-7 | BITS 8-15 | BITS 16-31 |
|---|---|---|---|
| 0 | HARDWARE TYPE= 0x0001 (ETHERNET) | | PROTOCOL TYPE= 0x0800 (IP) |
| 32 | HARDWARE ADDRESS LENGTH= 0x06 (ETHERNET) | PROTOCOL ADDRESS LENGTH= 0x04 (IPv4) | OPERATION CODE= 0x0001 (REQUEST) |
| 64 | SENDER HARDWARE ADDRESS (SHA)= 00:09:68:4D:FA:37 ⟹ 0x0009684D | | |
| 96 | SHA (CONTINUED)= 0xFA37 (MAC2) | | SENDER PROTOCOL ADDRESS (SPA)= 0.0.0.0. ⟹ 0x0000 |
| 128 | SPA (CONTINUED)= 0x0000 | | TARGET HARDWARE ADDRESS (THA)= 0x0000 |
| 160 | THA (CONTINUED)= 0x00000000 (IRRELEVANT) | | |
| 192 | TARGET PROTOCOL ADDRESS (TPA)= 10.10.10.114 ⟹ 0x0A0A0A72 (IP3) | | |

ARP REPLY HEADER

|  | BITS 0-7 | BITS 8-15 | BITS 16-31 |
|---|---|---|---|
| 0 | HARDWARE TYPE= 0x0001 (ETHERNET) | | PROTOCOL TYPE= 0x0800 (IP) |
| 32 | HARDWARE ADDRESS LENGTH= 0x06 (ETHERNET) | PROTOCOL ADDRESS LENGTH= 0x04 (IPv4) | OPERATION CODE = 0x0002 (REPLY) |
| 64 | SENDER HARDWARE ADDRESS (SHA) = 00:09:47:A3:2C:11 ⟹ 0x000947A3 | | |
| 96 | SHA (CONTINUED) = 0x2C11 (MAC3) | | SENDER PROTOCOL ADDRESS (SPA) = 10.10.10.114 ⟹ 0x0A0A |
| 128 | SPA (CONTINUED) = 0x0A72 (IP3) | | TARGET HARDWARE ADDRESS (THA) = 0x0009 |
| 160 | THA (CONTINUED) = 0x684DFA37 (MAC2) | | |
| 192 | TARGET PROTOCOL ADDRESS (TPA) = 0x00000000 | | |

FIG. 5B

HOST TRACKING IN A LAYER 2 IP ETHERNET NETWORK

BACKGROUND OF THE INVENTION

1. Field of the Invention

Embodiments of the present invention generally relate to the field of network security, and more particularly, to detecting and tracking the presence of end host machines in a layer 2 Ethernet network.

2. Description of the Related Art

One goal of network security is to prevent network access by unauthorized end host machines. To meet this goal, network access devices (NADs)—such as switches, routers, and wireless access points—dynamically grant access privileges to end user hosts upon request and revoke the hosts' access rights almost immediately should they get disconnected or become inactive. This security measure helps to prevent a malicious host from using the access privileges granted to an authorized host who is no longer connected to the network.

In order to monitor the existence of authorized hosts on a regular basis during their session lifetime, some type of host tracking mechanism is required that can be used by security applications operating on the NADs. However, switches and other types of layer 2 devices according to the Open Systems Interconnection Reference Model (OSI Model) are somewhat limited in their ability to track all types of hosts. For instance, one idea for switches has been to have this type of NAD constantly monitor the switched data traffic from the connected hosts. Because the data traffic is switched in hardware and may therefore not be seen by the control plane processor where the admission control security applications reside and operate, this idea is not feasible in all cases.

A second idea has been to have the authorized end hosts periodically send some keep alive messages to the NAD using a dedicated software application operating on layer 4 to layer 7 of the supplicants to assert their continued connection. This type of communication may require layer 3 Internet Protocol (IP) connectivity between the end hosts and the NAD, which is generally not available on a pure layer 2 NAD. Furthermore, it may not be feasible from an administrative point of view to install and configure all of the end hosts in a large scale network with such application specific client software for this purpose. Besides the sheer size of the network, the end host devices may range from managed IP hosts (which may be easily configurable by an administrator) to unmanaged IP hosts, guest personal computers (PCs), IP phones, and printers (where installing client specific application software may not be desirable, practical, or even possible on a given device). In addition, conventional supplicant application software oftentimes has reassessment/re-authentication timeouts configured to such a large value that they are rendered useless for tracking host liveliness.

Accordingly, what is needed is a platform independent method to detect the presence of any type of connected IP endpoint hosts by a layer 2 network access device and use this knowledge to enforce and revoke admission control privileges at layer 2.

SUMMARY OF THE INVENTION

One embodiment of the invention provides a method of tracking at least one host in a network on a network access device (NAD). The method generally includes transmitting an address resolution protocol (ARP) request to the at least one host without a correct media access control (MAC) address for the at least one host, receiving an ARP reply from the at least one host, wherein the ARP reply comprises the correct MAC address for the at least one host, and validating the correct MAC address for the at least one host.

Another embodiment of the invention provides a method tracking at least one host in a network on a tracking device. The method generally includes sending an address resolution protocol (ARP) request to the at least one host with information missing, receiving an ARP reply from the at least one host with the missing information supplied by the at least one host, and validating the missing information supplied.

Yet another embodiment of the invention provides a method of detecting and tracking at least one host in a network. The method generally includes learning a new media access control (MAC) address on a network access device (NAD) for the at least one host, updating a device tracking list stored on the NAD with the learned new MAC address, granting access privileges to the at least one host, sending an ARP request with a false MAC address from the NAD to the at least one host, sending an ARP reply with a response MAC address from the at least one host to the NAD, and checking the response MAC address against the learned MAC address stored in the device tracking list.

Yet another embodiment of the invention provides a network device for tracking at least one host on layer 2 of a network. The device generally includes at least one connector for sending address resolution protocol (ARP) requests and receiving ARP replies, a device tracking list that maintains at least one media access control (MAC) address corresponding to the at least one host, and an integrated circuit for deciding network access privileges for the at least one host based on the ARP replies or a lack thereof.

Yet another embodiment of the invention provides a network device for tracking at least one host on layer 2 of a network. The device generally includes an interface means for sending address resolution protocol (ARP) requests and receiving ARP replies, a storage means for maintaining at least one media access control (MAC) address corresponding to the at least one host, and a logic means for deciding network access privileges for the at least one host based on the ARP replies or a lack thereof.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a method and a system to detect end host machines in a layer 2 Ethernet network. The knowledge of the detected hosts may then be utilized by various security applications operating on layer 2 devices at the access and the distribution layers of the network for host session monitoring.

An Exemplary Host Tracking Mechanism in Layer 2

Figure 1A:
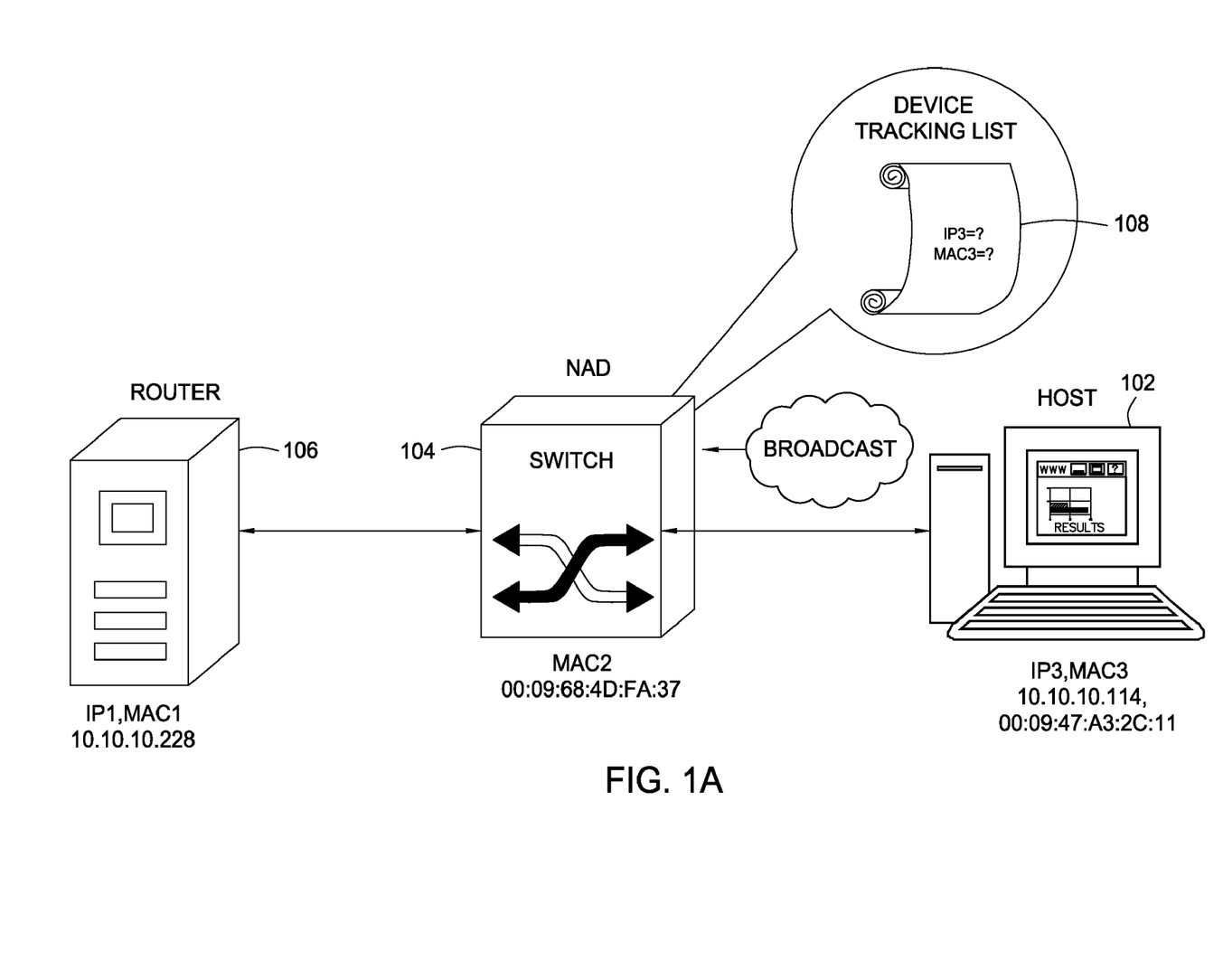
FIGS. 1A-C are block diagrams depicting a method for detecting and tracking hosts in a layer 2 network according to embodiments of the invention.

FIG. 1A is a block diagram illustrating certain network elements that may incorporate embodiments of the invention. A guest personal computer (PC) host 102 that may be trying to gain access to a network may be connected to any suitable layer 2 network access device (NAD), such as a switch. The NAD 104 may be connected to a router 106, which may be further connected to an authentication server (not shown). Additionally, the NAD 104 may also have other hosts (not shown) connected to it, and these hosts may comprise any number of network devices including managed and unmanaged network computers, guest PCs, Internet Protocol (IP) phones, and printers. Any of these hosts may also have other hosts connected to them (e.g. the NAD 104 connected to an IP phone which is connected to another computer). For some embodiments, the host 102 may be trying to access the network through a wireless connection to the NAD 104, wherein the NAD 104 is a wireless access point. However, for the purposes of this description, a physical connection between the NAD 104 and the guest host 102 will be considered henceforth.

The NAD 104 may also maintain a cache device tracking list 108 listing all of the authenticated IP and media access control (MAC) addresses for a given host once they have been learned. For this reason the NAD 104 may also be called a tracking device. In FIG. 1A, notice that the router 106 and the host 102 may have both IP and MAC addresses, while the NAD 104, being a layer 2 device, should only have a MAC address. At this point, the guest PC host 102 may have just been plugged into the network by connecting to the NAD 104, so the device tracking list 108 should not contain entries for the host 102 (i.e. the NAD 104 should not yet know IP3 and MAC3).

Figure 1B:
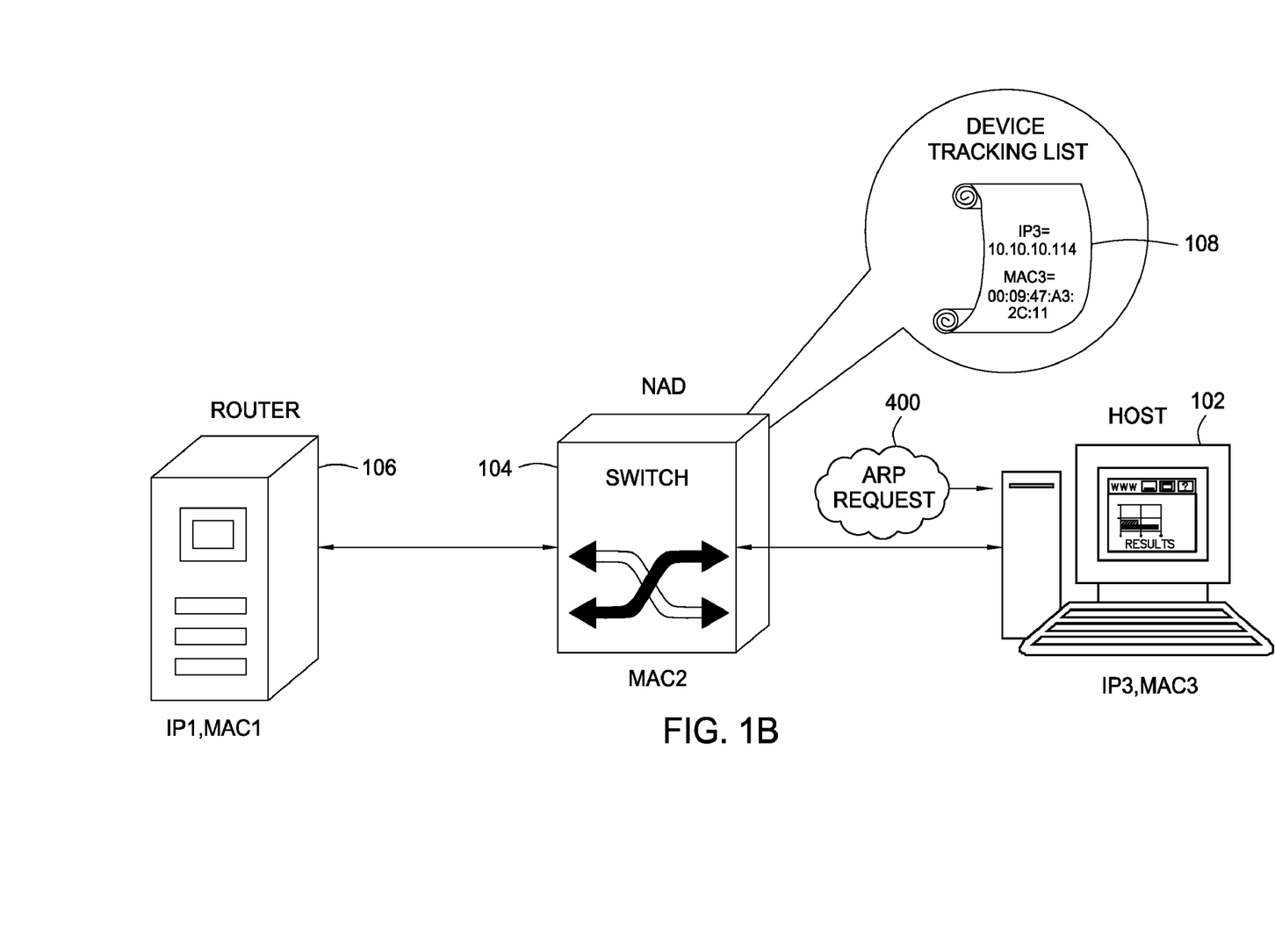
Figure 1C:
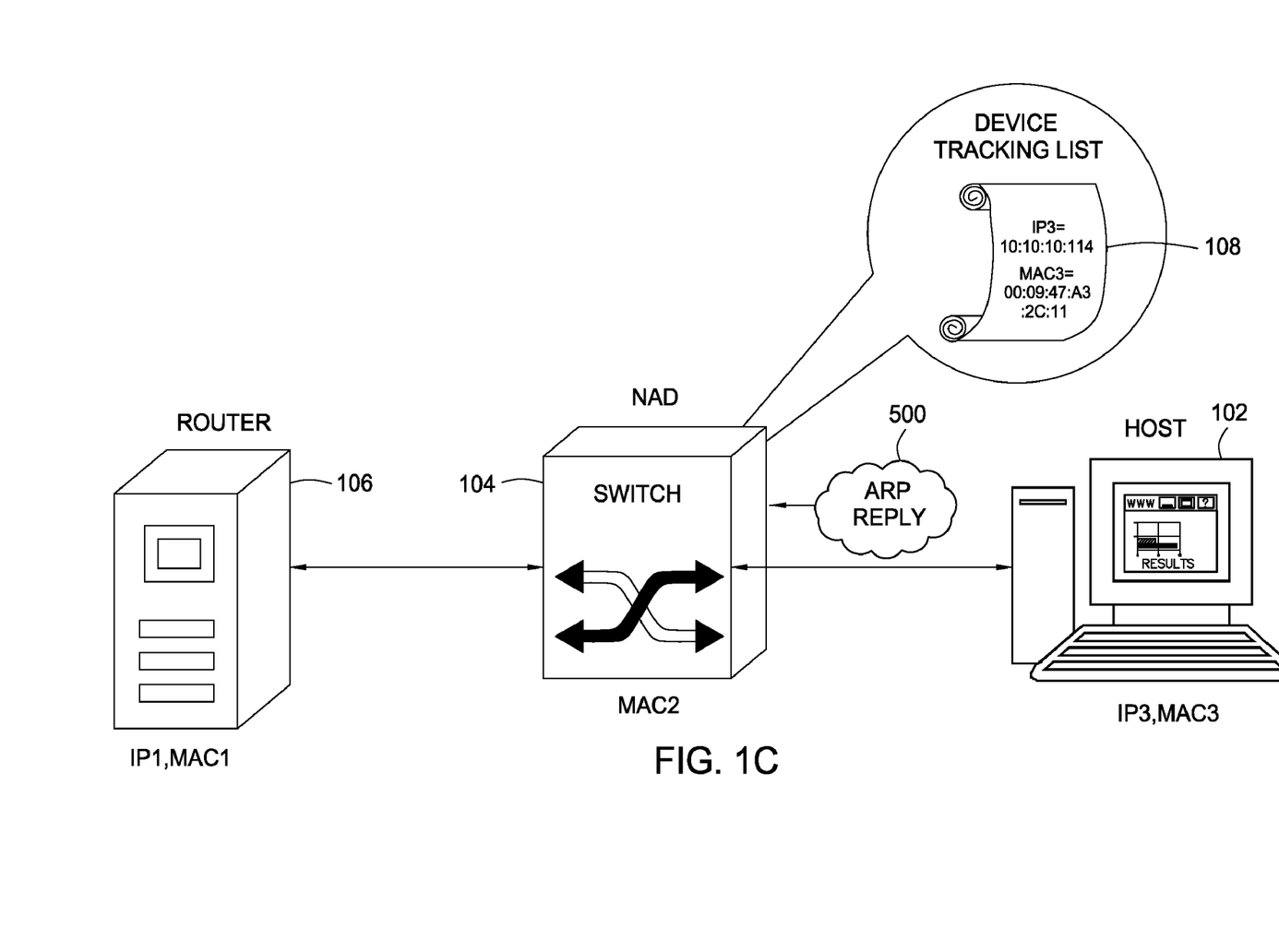

The operation of NAD 104, for some embodiments, may be described with reference to FIG. 2, which shows a flowchart of exemplary operations for host tracking on layer 2. In other words, the NAD 104 may perform the operations shown in FIG. 2, which may be described with simultaneous reference to FIGS. 1A-C. Those skilled in the art will recognize, however, that the components illustrated in FIGS. 1A-C are not limited to performing the operations shown in FIG. 2 and, further, that the operations shown in FIG. 2 may be performed by components other than those shown in FIGS. 1A-C.

The operations begin at step 202 upon the initial connection of a new host (e.g. the guest PC host 102) to the network. Once the guest PC host 102 has been connected, it may broadcast an initial Address Resolution Protocol (ARP) request packet according to step 202 in FIG. 2 in an effort to resolve the MAC address of the router 106 (MAC1). ARP is a network protocol used to obtain a network device's physical layer 2 address (MAC address) from its layer 3 (IP) address. An ARP packet may comprise an Ethernet header and an ARP header as shown in FIGS. 3A and 3B. The initial Ethernet header 300 from the host 102 may comprise a 48-bit destination MAC address 302, a 48-bit source MAC address 304 and a 16-bit frame type 306. The destination MAC address 302 may be set to FF:FF:FF:FF:FF:FF since the host 102 does not know the MAC address of the router 106 (MAC1) and may need to broadcast the request packet to every device on the network. The source MAC address 304 should be the MAC address of the host 102 (MAC3), and the frame type should be set to 0x0806 to indicate that the packet contains an ARP header.

Referring now to FIG. 3B, the initial ARP broadcast header 310 may contain 224 bits constructed as follows:

A hardware type field indicating the layer 2 protocol being used that may comprise 16 bits and should be set to 0x0001 indicating Ethernet hardware A protocol type field that may comprise 16 bits and should be set to 0x0800 indicating Internet Protocol (IP)

A hardware address length field that may comprise 8 bits and should be set to 0x06 indicating an address length of 6 bytes (48 bits) that is associated with Ethernet A protocol address length field that may comprise 8 bits and should be set to 0x04 indicating an address length of 4 bytes (32 bits) that is associated with IPv4 (Internet Protocol Version 4)

An operation code field that may comprise 16 bits and should be set to 0x0001 indicating a request A sender hardware address (SHA) that may comprise 48 bits according to the hardware address length field and should be set to MAC3, the MAC address of the host 102

A sender protocol address (SPA) that may comprise 32 bits according to the protocol address length field and should be set to IP3, the IP address of the host 102

A target hardware address (THA) that may comprise 48 bits according to the hardware address length field and should be set to all zeroes indicating that the MAC address is not known A target protocol address (TPA) that may comprise 32 bits according to the protocol address length field and should be set to IP1, the IP address of the router 106

At step 204, from this initial ARP broadcast packet, the NAD 104 may detect the IP address and the MAC address of the host 102 (IP3 and MAC3, respectively). The detection may be accomplished through any one of several different suitable methods. One method may be to snoop the initial ARP broadcast packet intended for the router 106 and extract the host IP address (IP3) and the host MAC address (MAC3) from the SPA and SHA fields, respectively, in the initial ARP request header 310. Another method may be to snoop Dynamic Host Configuration Protocol (DHCP) messages exchanged between the host 102 and a DHCP server.

Once the NAD 104 has learned the MAC address of the host 102 (MAC3), it may store the host IP address (IP3) and host MAC address (MAC3) in the device tracking list 108 and the authentication process may begin. In the authentication process, the guest PC host 102 and the authentication server may exchange information required to authenticate the identity of the host 102. The NAD 104 may simply relay this information between the host 102 and the authentication server. After the host 102 has been successfully authenticated, the NAD 104 may receive the authorization policies, may grant access to the host 102 and may enforce network privileges as defined in those policies.

Now that the guest PC host 102 has been granted network access and privileges, the NAD 104 may periodically check the liveliness of the host 102 in an effort to ensure that it is still connected and is still active. By using ARP in the manner described below, host tracking may be accomplished on layer 2 network access devices without ever enabling the IP routing capability of layer 3.

An Exemplary ARP Request for Host Tracking

Figure 4A:
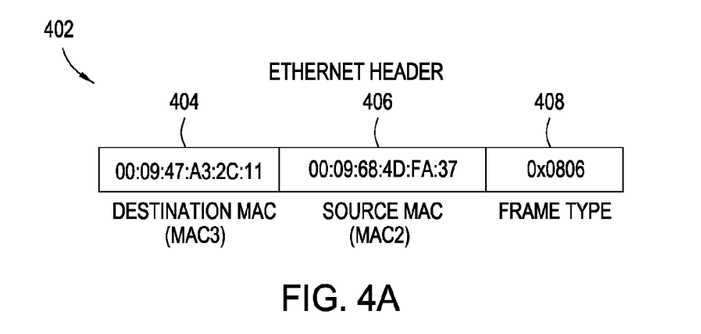
FIGS. 4A-B are packet tables portraying exemplary Ethernet and ARP headers associated with an ARP request from a network access device (NAD) to a host according to embodiments of the invention.
Figure 4B:
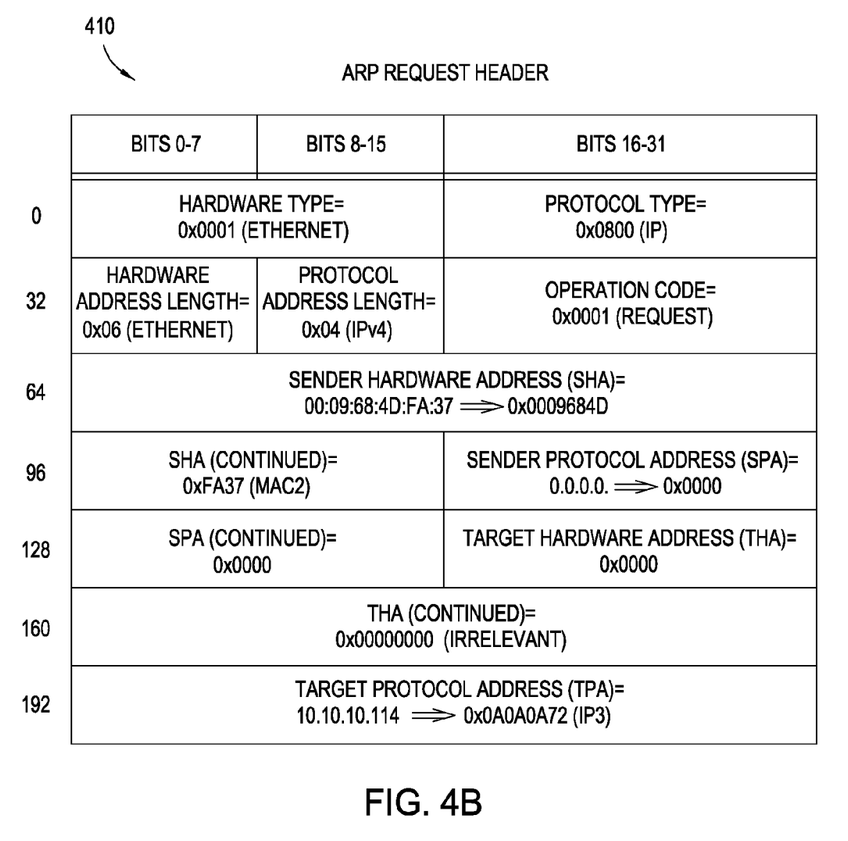

At step 206, the NAD 104 (referring again to FIG. 1B) may periodically send an ARP request packet 400. For some embodiments, the ARP request packet may be constructed as shown in FIGS. 4A and 4B. The ARP request packet may comprise an Ethernet header 402 and an ARP header 410. The ARP request Ethernet header 402 from the NAD 104 may comprise a 48-bit destination MAC address 404, a 48-bit source MAC address 406 and a 16-bit frame type 408. Now that the NAD 104 should know and may have maintained the host IP address (IP3) and host MAC address (MAC3) in the device tracking list 108, the destination MAC address 404 may be set to MAC3. In this manner, the ARP request packet 400 is unicast, rather than broadcast, to the host 102 to an effort to ensure that the layer 2 network is not overwhelmed by the extra traffic according to embodiments of the invention and only the host 102 in question receives the packet 400. The source MAC address 406 should be the MAC address of the NAD 104 (MAC2), and the frame type 408 should be set to 0x0806 to indicate that the packet 400 contains an ARP header 410.

Referring now to FIG. 4B, the ARP request header 410 may contain 224 bits constructed with the same fields and field lengths as described above, but with some differences as described below:

The hardware type field indicating the layer 2 protocol being used should be set to 0x0001 indicating Ethernet hardware The protocol type field should be set to 0x0800 indicating Internet Protocol (IP)

The hardware address length field should be set to 0x06 indicating an address length of 6 bytes (48 bits) that is associated with Ethernet The protocol address length field should be set to 0x04 indicating an address length of 4 bytes (32 bits) that is associated with IPv4 (Internet Protocol Version 4)

The operation code field should be set to 0x0001 indicating a request

The sender hardware address (SHA) should be set to MAC2, the MAC address of the NAD 104

The sender protocol address (SPA) should be set to 0.0.0.0

The target hardware address (THA) should be set to all zeroes or all ones (0xFFFFFFFFFFFF)

The target protocol address (TPA) should be set to IP3, the IP address of the host 102

Note that the THA should be set to all zeroes or all ones. Even though the NAD 104 should know the host MAC address (MAC3), this information should not be supplied in the ARP request packet. In this manner, as will be explained below, an authorized host, such as the guest host PC 102, can reply to the ARP request with its own MAC address that may be checked by the NAD 104 against the MAC address stored in the device tracking list 108 for the host in question. Ideally, a malicious host that may be trying to exploit access privileges granted to another authorized host should not be able to supply a MAC address matching that of the authorized host.

In addition, it may be very crucial that the SPA field is set to 0.0.0.0. This should prevent the host 102 from updating its layer 3 ARP cache with the information supplied in the SHA and SPA fields. Because the NAD 104 is a layer 2 device, the NAD 104 should not have an IP address, and the host 102 should not send any subsequent IP traffic to the NAD 104 for routing purposes. Otherwise, this could disrupt the IP communication of the host 102 in the network.

An Exemplary ARP Reply for Host Tracking

Figure 5A:
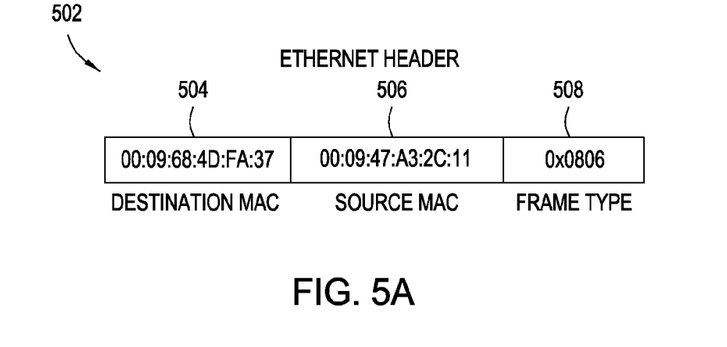
FIGS. 5A-B are packet tables portraying exemplary Ethernet and ARP headers associated with an ARP reply from a host to a NAD according to embodiments of the invention.
Figure 5B:
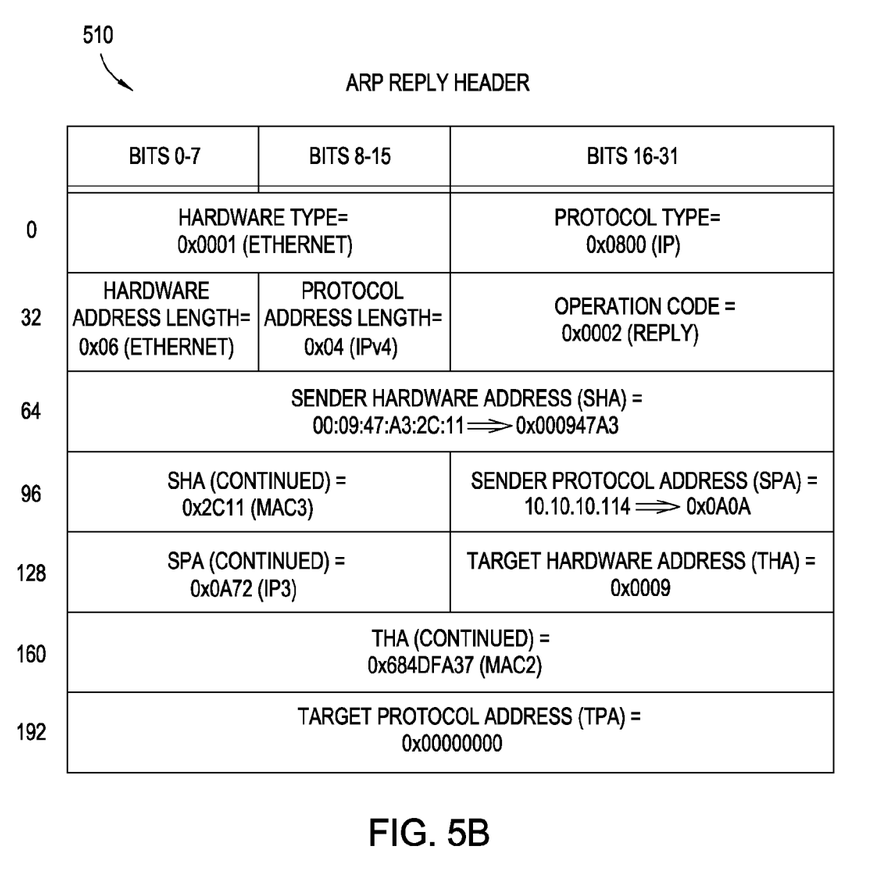

At step 210, after the host 102 receives the ARP request packet 400, it should send a unicast ARP reply packet 500 to the NAD 104 if it is still connected and still active in step 208 as illustrated in FIG. 1c. For some embodiments, the ARP reply packet 500 may be constructed as shown in FIGS. 5A and 5B and may comprise an Ethernet header 502 and an ARP header 510. The ARP reply Ethernet header 502 from the NAD 104 may comprise a 48-bit destination MAC address 504, a 48-bit source MAC address 506 and a 16-bit frame type 508. Since the host 102 is replying to an ARP request packet 400 from the NAD 104, the destination MAC address 504 may be set to MAC2. The source MAC address 506 should be the MAC address of the host 102 (MAC3), and the frame type 508 should be set to 0x0806 to indicate that the packet 500 contains an ARP header 510.

Referring now to FIG. 5B, the ARP reply header 510 may contain 224 bits constructed by the host 102 with the same fields and field lengths as described above, but with some differences as described below:

The hardware type field indicating the layer 2 protocol being used should be set to 0x0001 indicating Ethernet hardware The protocol type field should be set to 0x0800 indicating Internet Protocol (IP)

The hardware address length field should be set to 0x06 indicating an address length of 6 bytes (48 bits) that is associated with Ethernet The protocol address length field should be set to 0x04 indicating an address length of 4 bytes (32 bits) that is associated with IPv4 (Internet Protocol Version 4)

The operation code field should be set to 0x0002 indicating a reply

The sender hardware address (SHA) should be set to MAC3, the MAC address of the host 102

The sender protocol address (SPA) should be set to IP3, the IP address of the host 102

The target hardware address (THA) should be set to MAC2, the MAC address of the NAD 104

The target protocol address (TPA) should be set to 0.0.0.0, the previously provided and false IP address of the NAD 104, which should prevent the NAD 104 from updating its own layer 3 ARP cache In step 212, when the NAD 104 receives the ARP reply packet 500 from the host 102, it may check the host MAC address (MAC3) against the information stored in its device tracking list 108 to detect the presence of and validate the host 102. If the NAD 104 does not receive a valid MAC address in the SHA field of the ARP reply packet 500 in step 214 or the host 102 does not respond, the NAD 104 may repeat the ARP request/reply procedure a suitable number of times (e.g. 2 repeats) according to step 216 before revoking access privileges to the host 102 or placing an entire port connected to the host 102 in a linkdown state in step 218.

Figure 2:
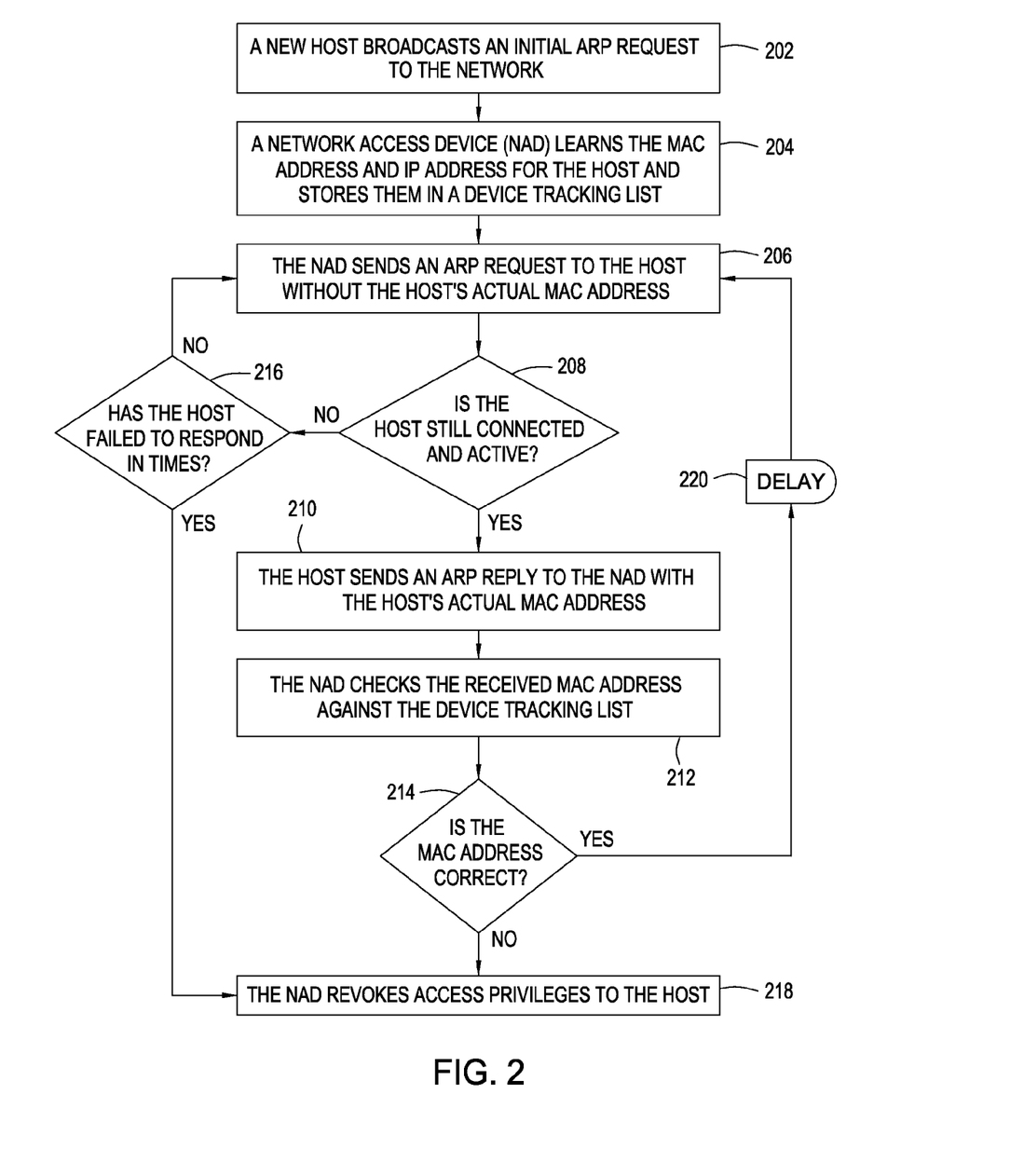
FIG. 2 is a flowchart illustrating a method for detecting and tracking hosts in a layer 2 network according to embodiments of the invention.
Figure 3A:
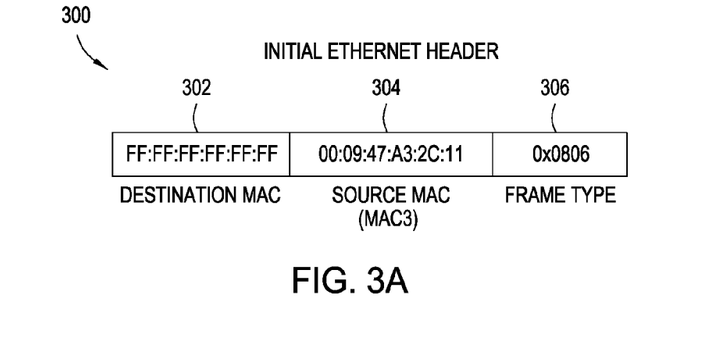
FIGS. 3A-B are packet tables portraying exemplary Ethernet and Address Resolution Protocol (ARP) headers associated with an initial Ethernet broadcast by the host according to embodiments of the invention.
Figure 3B:
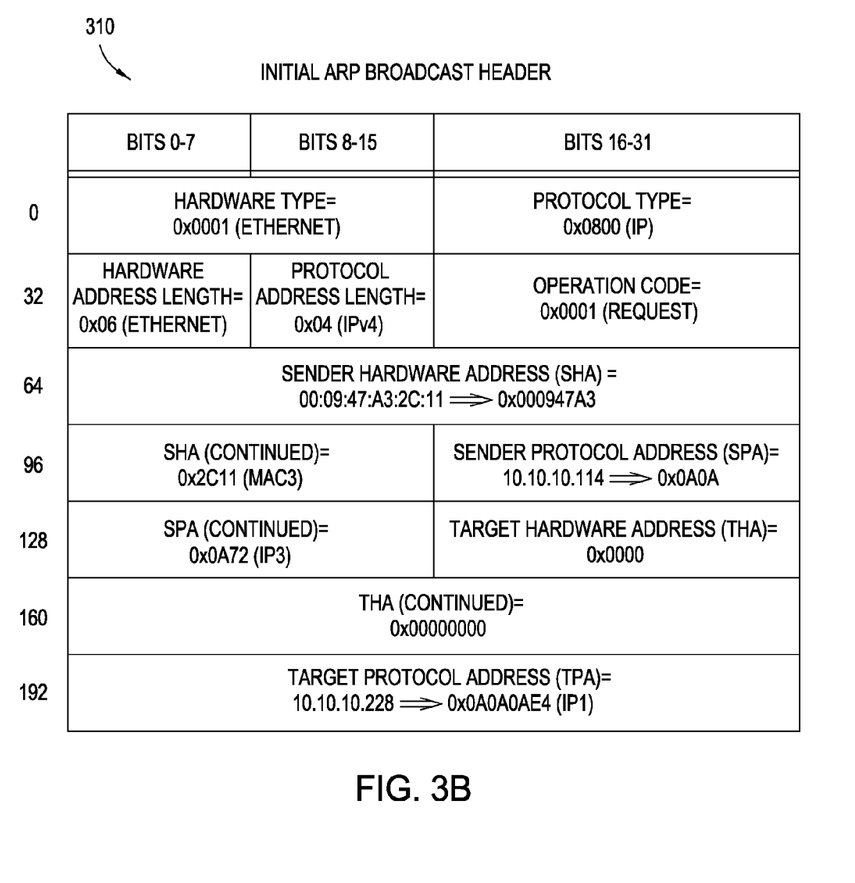

For some embodiments and according to FIG. 2, the NAD 104 may revoke access privileges to the host 102 in step 218 immediately after receiving an invalid MAC address in the SHA field of the ARP reply packet 500. After revoking privileges to the guest PC host 102, the NAD 104 may remove or quarantine the host IP address (IP3) and host MAC address (MAC3) in the device tracking list 108. Should the host 102 be reconnected or become active again, the process may repeat from the beginning where the NAD 104 has to relearn the host MAC address (MAC3) for some embodiments.

Furthermore, the NAD 104 should not use the information in the ARP reply packet 500 to update its own layer 3 ARP cache, unless the NAD 104 is acting as a gateway for host traffic (i.e. IP is enabled for a host subnet on the NAD). In fact, the ARP reply packet 500 with a TPA of all zeroes should be dropped after being processed by the NAD 104.

At step 220, the ARP request/reply probing mechanism to track the liveliness of connected hosts should be repeated at regular intervals, as previously described. Regular monitoring may permit the NAD 104 to revoke access privileges shortly after an end host machine has been disconnected or has remained inactive. For some embodiments, a default probing interval may be set to 30 seconds. Resending an ARP request to an unresponsive host may occur on a shorter interval when repeated following step 216.

Host tracking in layer 2 using the ARP request/reply method as described above may provide a simple mechanism to detect the presence of authorized hosts. Because ARP is a very generic protocol available on layer 2, this host tracking method should not pose any interoperability requirements. Moreover, host tracking in this manner should be platform-independent, working with hosts ranging from unmanaged PCs to IP phones to printers, and should not require dedicated application software running on these end hosts.

In addition, this tracking mechanism should have no dependencies on how many layer 2 hops away the NAD 104 is from an endpoint host. It should learn the new hosts using ARP or DHCP snooping and build the device tracking list 108 which may then be used to send ARP requests to this endpoint host. Furthermore, host tracking according to embodiments of the invention should have virtually no impact on the data switching performance of the network since the ARP requests and replies should be unicast and this method should not require intercepting the host data traffic in the network.

While the foregoing is directed to embodiments of the present invention, other and further embodiments of the invention may be devised without departing from the basic scope thereof, and the scope thereof is determined by the claims that follow.

The invention claimed is:

1. A method of tracking at least one host in a network on a tracking device, comprising:
   a) sending a unicast address resolution protocol (ARP) request to the at least one host, wherein the unicast ARP request includes:
      a target hardware address (THA) field associated with the at least one host with a value set to all zeroes or all ones indicating a missing media access control (MAC) address for the at least one host,
      a source protocol address (SPA) field associated with a sender of the unicast ARP request with a value set to all zeroes to prevent the at least one host from updating an ARP cache associated with the at least one host with the information in the SPA field, and
      a target protocol address (TPA) field associated with the at least one host with a value indicating an authenticated IP address of the at least one host stored in a device tracking list that also stores an authenticated MAC address for the at least one host;
   b) receiving an ARP reply from the at least one host with the missing MAC address supplied by the at least one host; and
   c) validating the missing MAC address supplied by comparing the missing MAC address to the authenticated MAC address stored in the device tracking list.

2. The method of claim 1, wherein the missing MAC address is a correct MAC address for the host.

3. The method of claim 1, further comprising periodically repeating steps a)-c).

4. The method of claim 3, further comprising revoking access privileges granted to the at least one host if the missing MAC address supplied cannot be validated within a defined period.

5. A method of detecting and tracking at least one host in a network by a network address device (NAD), the method comprising:
   a) learning a new media access control (MAC) address for the at least one host;
   b) updating a device tracking list stored on the NAD with the learned new MAC address, wherein the device tracking list stores an authenticated Internet Protocol (IP) address and the learned new MAC address for the at least one host;
   c) granting access privileges to the at least one host;
   d) sending a unicast ARP request from the NAD to the at least one host, wherein the unicast ARP request includes:
      a target hardware address (THA) field associated with the at least one host with a value set to all zeroes or all ones indicating a false MAC address for the at least one host,
      a source protocol address (SPA) field associated with the NAD with a value set to all zeroes to prevent the at least one host from updating an ARP cache associated with the at least one host with the information in the SPA field, and
      a target protocol address (TPA) field associated with the at least one host with a value indicating the authenticated IP address of the at least one host stored in the device tracking list;
   e) receiving an ARP reply with a response MAC address from the at least one host; and
   f) checking the response MAC address against the learned MAC address stored in the device tracking list.

6. The method of claim 5, further comprising revoking the access privileges of the at least one host in response to one or more of the following conditions:
   the response MAC address does not match the learned MAC address stored in the device tracking list, the at least one host does not respond, or the at least one host has been disconnected from the network.

7. The method of claim 6, further comprising quarantining the learned MAC address of the at least one host whose access privileges have been revoked from the device tracking list.

8. The method of claim 5, further comprising repeating steps d)-e) until either the response MAC address matches the learned MAC address or steps d)-e) have been repeated a predetermined number of times.

9. The method of claim 8, further comprising revoking the access privileges of the at least one host if steps d)-e) have been repeated a predetermined number of times.

10. The method of claim 5, wherein learning the new MAC address comprises snooping an ARP request broadcast from the at least one host to the network and extracting a new internet protocol (IP) address and the new MAC address for the at least one host.

11. The method of claim 5, wherein learning the new MAC address comprises snooping a dynamic host configuration protocol (DHCP) message during authentication of the at least one host.

12. A network device for tracking a host on layer 2 of a network, the device comprising:

a device tracking list for maintaining at least one media access control (MAC) address and at least one Internet Protocol (IP) address corresponding to the host; and logic configured to track the host by periodically sending unicast ARP requests to the host, wherein the unicast ARP requests include:

a target hardware address (THA) field associated with the at least one host with a value set to all zeroes or all ones indicating a false MAC address for the host, a source protocol address (SPA) field associated with the network device with a value set to all zeroes to prevent the at least one host from updating an ARP cache associated with the at least one host with the information in the SPA field, and a target protocol address (TPA) field associated with the at least one host with a value indicating the at least one IP address of the host stored in the device tracking list and assign network access privileges for the host based on ARP replies received or not received from the host.

13. The network device of claim 12, wherein the device tracking list is used to maintain an internet protocol (IP) address corresponding to the host.

14. The network device of claim 12, wherein the logic is configured to revoke access privileges of the host in response to one or more of the following conditions: a MAC address received in an ARP reply from the host does not match a learned MAC address stored in the device tracking list, the host does not respond, or the host has been disconnected from the network.

15. The method of claim 12, wherein the logic is configured to learn a MAC address of the host by snooping an ARP request broadcast from the host.

16. The method of claim 12, wherein the logic is configured to learn a MAC address of the host by snooping a dynamic host configuration protocol (DHCP) message during authentication of the host.

* * * * *